United States Patent [19]

McCurdy et al.

[11] Patent Number: 4,705,672

[45] Date of Patent: Nov. 10, 1987

[54] PROCESS TO IMPROVE THE REMOVAL OF SUSPENDED SOLIDS IN LEACHED URANIUM ORE CLARIFICATION

[75] Inventors: John W. McCurdy, Toronto; Brian H. Danyliw, Lively, both of Canada

[73] Assignee: Calgon Corporation, Pittsburgh, Pa.

[21] Appl. No.: 856,552

[22] Filed: Apr. 28, 1986

[51] Int. Cl.$^4$ .............. C01G 56/00; C01G 57/00; B01D 21/01; C02F 1/52

[52] U.S. Cl. ........................ 423/3; 210/728; 210/734; 210/735; 252/627; 252/631; 423/11; 423/20

[58] Field of Search .......... 252/631, 61, 627, 180; 423/2, 3, 7, 6, 11, 8, 12, 15, 18, 20, 26, 9; 210/682, 703, 733, 734, 735, 728; 299/5

[56] References Cited

U.S. PATENT DOCUMENTS

| | | |
|---|---|---|
| 3,479,284 | 11/1969 | Lees ........................... 210/54 |
| 3,489,681 | 1/1970 | Flock et al. ................ 210/734 |
| 3,637,491 | 1/1972 | Hedrick et al. ............ 210/734 |
| 4,113,685 | 9/1978 | Hubner et al. ............. 210/734 |
| 4,137,165 | 1/1979 | Coscia et al. .............. 210/734 |
| 4,141,854 | 2/1979 | Pavilcius et al. ........... 423/10 |
| 4,154,698 | 5/1979 | Doft ............................. 423/8 |
| 4,342,653 | 8/1982 | Halverson .................. 210/734 |
| 4,410,497 | 10/1983 | Otto, Jr. ..................... 423/11 |
| 4,587,108 | 5/1986 | MacDonald ................ 423/11 |

Primary Examiner—John F. Terapane
Assistant Examiner—Howard J. Locker
Attorney, Agent, or Firm—W. C. Mitchell; R. B. Olson; M. C. Sudol, Jr.

[57] ABSTRACT

The present invention is directed to a process to improve the suspended solids removal by the filter cloth used in the clarification of leached uranium ore, comprising contacting the filter cloth with an effective amount of an acrylamide polymer.

1 Claim, No Drawings

PROCESS TO IMPROVE THE REMOVAL OF SUSPENDED SOLIDS IN LEACHED URANIUM ORE CLARIFICATION

BACKGROUND OF THE INVENTION

Processes for the clarification of leached uranium ore generally run acid leach slurry onto a horizontal vacuum belt filter. Flocculant, i.e., polymers including acrylamide polymers, is added to the slurry in a conditioning tank prior to the filter to aid in dewatering. Vacuum removes the filtrate (pregnant liquor) and the cake is washed to remove most of the remaining values. The filtrates which are still high in suspended solids must have additional flocculant added in a subsequent thickener prior to ion exchange or solvent recovery. There is a need to increase the suspended solids collected on the filter cloth to avoid the susequent addition of flocculant to the filtrate.

The present invention was surprisingly found to increase the suspended solids removed from the slurry by the filter cloth.

DESCRIPTION OF THE INVENTION

The present invention is directed to a process to improve the suspended solids removal by the filter cloth used in the clarification of leached uranium ore, comprising contacting the filter cloth with an effective amount of an acrylamide polymer.

Any acrylamide polymer may be used. Examples include homopolymers of acrylamide and copolymers (including terpolymers, etc.) of acrylamide. Examples of copolymers include acrylamide/dimethyl diallyl ammonium chloride (AM/DMDAAC) and acrylamide/acrylic acid (AM/AA). The acrylamide/acrylic acid copolymer may be prepared by copolymerizing the monomers or by hydrolyzing polyacrylamide. Although the molecular weight is not critical, if the polymer is either anionic or nonionic, the preferred weight average molecular weight range is 3,000,000 to 10,000,000. If the polymer is cationic, the preferred weight average molecular weight is 1,000,000 to 10,000,000.

Although the amount of acrylamide present in the copolymers is not critical, it is preferred that at least 50%, by weight, of the copolymer be acrylamide, most preferably at least 90%, by weight.

Mixtures of the polymers may be used.

The polymer dosage is generally preferred to be in the range of 0.1 to 50 ppm, most preferably 0.1 to 10 ppm.

The polymer may be added to the filter cloth in any manner. The easiest method is to have a spray bar, spray the polymer on a continuous filter cloth belt prior to the slurry contacting the filter cloth.

The polymers of the invention may be added to the slurry in addition to adding to the filter cloth. It was found that if the polymer is added solely to the slurry, three times the total dosage (slurry and filter cloth) was necessary to obtain similar results to addition to both the slurry and filter cloth.

EXAMPLES 30 ppm of various polymers were added as a flocculant to a sample of leached uranium ore slurry. The slurry was then drawn by vacuum through a filter cloth. Except for the controls, the filter cloth was sprayed with various amounts of polymer prior to being contacted with the slurry. The time that it took for the surface of the cake to dry was measured with some of the samples (Table I). In other samples the time that it took for water to stop passing through the filter was measured (Table II). The effectiveness of the preconditioner (polymer sprayed on the filter) was determined by observing the clarity of the filtrate. The vacuum pressure was the same throughout. The intent in measuring form time or dry time was to see if the preconditioner was slowing down the process.

TABLE I

| Flocculant Polymer (slurry) (30 ppm) | Preconditioner (filter) | Form Time (sec.) | Filtrate Clarity |
|---|---|---|---|
| AM/AA[1] | water only | 16 | cloudy |
| AM/AA | 1 ml AM/AA | 13 | clear |
| AM/AA | 2 ml AM/AA | 15 | clear |
| AM/AA | 3 ml AM/AA | 16 | good |
| polyacrylamide | 1 ml polyacrylamide | 11 | good |
| polyacrylamide | 2 ml polyacrylamide | 11 | slightly cloudy |
| polyacrylamide | 3 ml polyacrylamide | 13 | good |
| AM/DMDAAC[2] | 1 ml AM/DMDAAC | 12 | clear |
| AM/DMDAAC | 2 ml AM/DMDAAC | 12 | excellent |
| AM/DMDAAC | 3 ml AM/DMDAAC | 16 | clear |

The order of clarity is: poor, cloudy, slightly cloudy, clear, good, excellent.
[1] AM/AA is a copolymer of 97% (by wt.) acrylamide and 3% acrylic acid, having a weight average molecular weight of about $7.4 \times 10^6$.
[2] polyacrylamide having a weight average molecular weight of $7 \times 10^6$ to $10 \times 10^6$ (Allied Colloids 455).
[3] AM/DMDAAC is a copolymer of 85% (by wt.) acrylamide and 15% dimethyl diallylammonium chloride, having a weight molecular weight of about $4.3 \times 10^6$ (intrinsic viscosity 7-11 in 1.0 M NaCl).

TABLE II

| Flocculant Polymer (slurry) (30 ppm) | Preconditioner (filter) | Dry Time (sec.) | Filtrate Clarity |
|---|---|---|---|
| AM/AA[1] | none | 17 | poor |
| AM/AA | water only | 17 | poor |
| AM/AA | none (although rinsed, some residual AM/DMDAAC[2]) | 14 | slightly hazy |
| AM/AA | 2 ml AM/DMDAAC | 17 | clear |
| polyacrylamide (Mw = $7.5 \times 10^6$) | none (although rinsed, some residual AM/DMDAAC | 15 | slightly hazy |
| polyacrylamide (Mw = $7.5 \times 10^6$) | 2 ml AM/DMDAAC | 17 | excellent |

[1] AM/AA is a copolymer of 97% (by wt.) acrylamide and 3% acrylic acid (3% hydrolyzed acrylamide), having a weight average molecular weight of about $7.4 \times 10^6$.
[2] AM/DMDAAC is a copolymer of 85% (by wt.) acrylamide and 15% dimethyl diallylammonium chloride, having a weight average molecular weight of about $4.3 \times 10^6$ (intrinsic viscosity 7-11 in 1.0 M NaCl).

What is claimed is:

1. A process to improve suspended solids removal from leached uranium ore by filtration on a filter cloth comprising (a) contacting, prior to contact with said leached uranium ore, said filter cloth with an effective amount of a polymer selected from the group consisting of homopolymers of acrylamide having a molecular weight of 3,000,000 to 8,000,000 and copolymers of acrylamide and dimethyl diallyl ammonium chloride having a molecular weight of 1,000,000 to 8,000,000, containing at least 50% acrylamide and less than 50% dimethyl diallyl ammonium chloride, by weight; and (b) passing said leached uranium ore through said filter cloth, wherein said leached uranium ore contains an effective amount of an acrylamide polymer as a filtration aid.

* * * * *